(12) United States Patent
Seendripu et al.

(10) Patent No.: US 9,209,852 B2
(45) Date of Patent: Dec. 8, 2015

(54) MODULAR MICROWAVE BACKHAUL OUTDOOR UNIT

(71) Applicant: MaxLinear, Inc., Carlsbad, CA (US)

(72) Inventors: Kishore Seendripu, Carlsbad, CA (US); Raja Pullela, Irvine, CA (US); Madhukar Reddy, Carlsbad, CA (US); Tim Gallagher, Encinitas, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 14/492,891

(22) Filed: Sep. 22, 2014

(65) Prior Publication Data

US 2015/0085904 A1      Mar. 26, 2015

Related U.S. Application Data

(60) Provisional application No. 61/881,016, filed on Sep. 23, 2013, provisional application No. 61/884,765, filed on Sep. 30, 2013.

(51) Int. Cl.
| | |
|---|---|
| *H04B 1/38* | (2015.01) |
| *H04B 1/40* | (2015.01) |
| *H04L 25/02* | (2006.01) |
| *H04L 27/20* | (2006.01) |
| *H04L 27/22* | (2006.01) |
| *H04H 60/19* | (2008.01) |
| *H04B 1/00* | (2006.01) |
| *H04L 27/36* | (2006.01) |
| *H04L 27/38* | (2006.01) |

(52) U.S. Cl.
CPC ............... *H04B 1/40* (2013.01); *H04B 1/0067* (2013.01); *H04H 60/19* (2013.01); *H04L 25/02* (2013.01); *H04L 27/20* (2013.01); *H04L 27/22* (2013.01); *H04L 27/36* (2013.01); *H04L 27/38* (2013.01)

(58) Field of Classification Search
CPC ........................................................ H04B 1/40
USPC ........................................................ 375/219
See application file for complete search history.

(56) References Cited

U.S. PATENT DOCUMENTS

| | | | | |
|---|---|---|---|---|
| 7,460,584 | B2* | 12/2008 | Parker et al. ................... | 375/219 |
| 2007/0189403 | A1* | 8/2007 | Alletto et al. .................. | 375/260 |
| 2007/0213096 | A1* | 9/2007 | Bella et al. ..................... | 455/558 |
| 2008/0285617 | A1* | 11/2008 | Moldover et al. ............. | 374/117 |

* cited by examiner

*Primary Examiner* — Lihong Yu
(74) *Attorney, Agent, or Firm* — McAndrews, Held & Malloy, Ltd.

(57) ABSTRACT

A microwave backhaul system may comprise a monolithic integrated circuit comprising an on-chip transceiver, digital baseband processing circuitry, and auxiliary interface circuitry. The on-chip transceiver may process a microwave signal from an antenna element to generate a first pair of quadrature baseband signals and convey the first pair of phase-quadrature baseband signals to the digital baseband processing circuitry. The auxiliary interface circuitry may receive one or more auxiliary signals from a source that is external to the monolithic integrated circuit and convey the one or more auxiliary signals to the digital baseband processing circuitry. The digital baseband processing circuitry may be operable to process signals to generate one or more second pairs of phase-quadrature digital baseband signals.

20 Claims, 8 Drawing Sheets

MODULAR MICROWAVE BACKHAUL OUTDOOR UNIT

PRIORITY CLAIM

This application claims priority to and the benefit of the following application(s), each of which is hereby incorporated herein by reference:

U.S. provisional patent application 61/881,016 titled "Microwave Backhaul Methods and Systems" filed on Sep. 23, 2013; and U.S. provisional patent application 61/884,765 titled "Microwave Backhaul Methods and Systems" filed on Sep. 30, 2013.

INCORPORATION BY REFERENCE

The entirety of each of the following is incorporated herein by reference:

United States Patent Application Publication 20130205349 titled "Method and System for Integrated Stacking for Handling Channel Stacking or Band Stacking;"

U.S. patent application Ser. No. 14/249,014 titled "Automatic Twist and Sway Compensation in a Microwave Backhaul Transceiver;" and U.S. patent application Ser. No. 14/492,143 titled "Microwave Backhaul System Supporting Multiple Installation Configurations."

TECHNICAL FIELD

Certain embodiments of the invention relate to wireless communications. More specifically, certain embodiments of the invention relate to methods and systems for microwave backhaul.

BACKGROUND

Conventional methods and systems for microwave backhaul are inefficient. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for microwave backhaul, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. The term "and/or" in this example has the same scope as the term "one or both of x and y". As another example, "x, y, and/or z" means any element of the seven-element set {(x), (y), (z), (x, y), (x, z), (y, z), (x, y, z)}. The term "and/or" in this example has the same scope as the term "one or more of x, y and z". As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
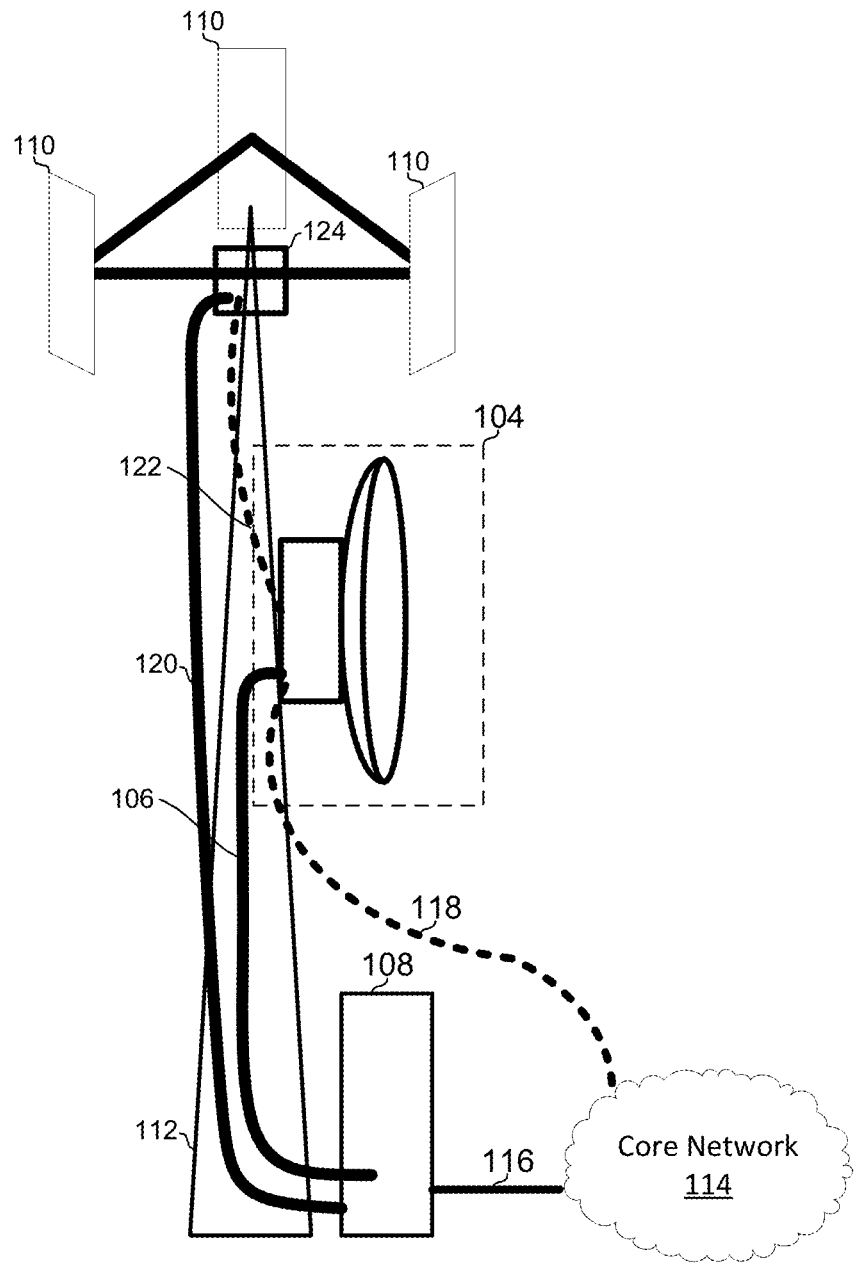
FIG. 1 shows an example microwave backhaul outdoor unit mounted to a cellular tower

FIG. 1 shows an example microwave backhaul outdoor unit mounted to a cellular tower. The example implementation depicted comprises cellular antennas 110, cellular signal processing unit 124, a mast 112, a microwave backhaul outdoor unit (ODU) 104, and an indoor unit (IDU) 108.

The cellular antennas 110 may capture cellular signals and output the signals to cellular processing circuitry 124. In an example implementation, the circuitry 124 may output common public radio interface (CPRI) signals to the IDU 108 via cable 120 and demodulation of the cellular signals may be carried out in circuitry of the IDU 108. In an example implementation, the circuitry 124 may perform demodulation of the cellular signals and may output demodulated data onto the cable 122 in accordance with a determined networking standard (e.g., Gigabit Ethernet over coax or fiber).

Figure 2:
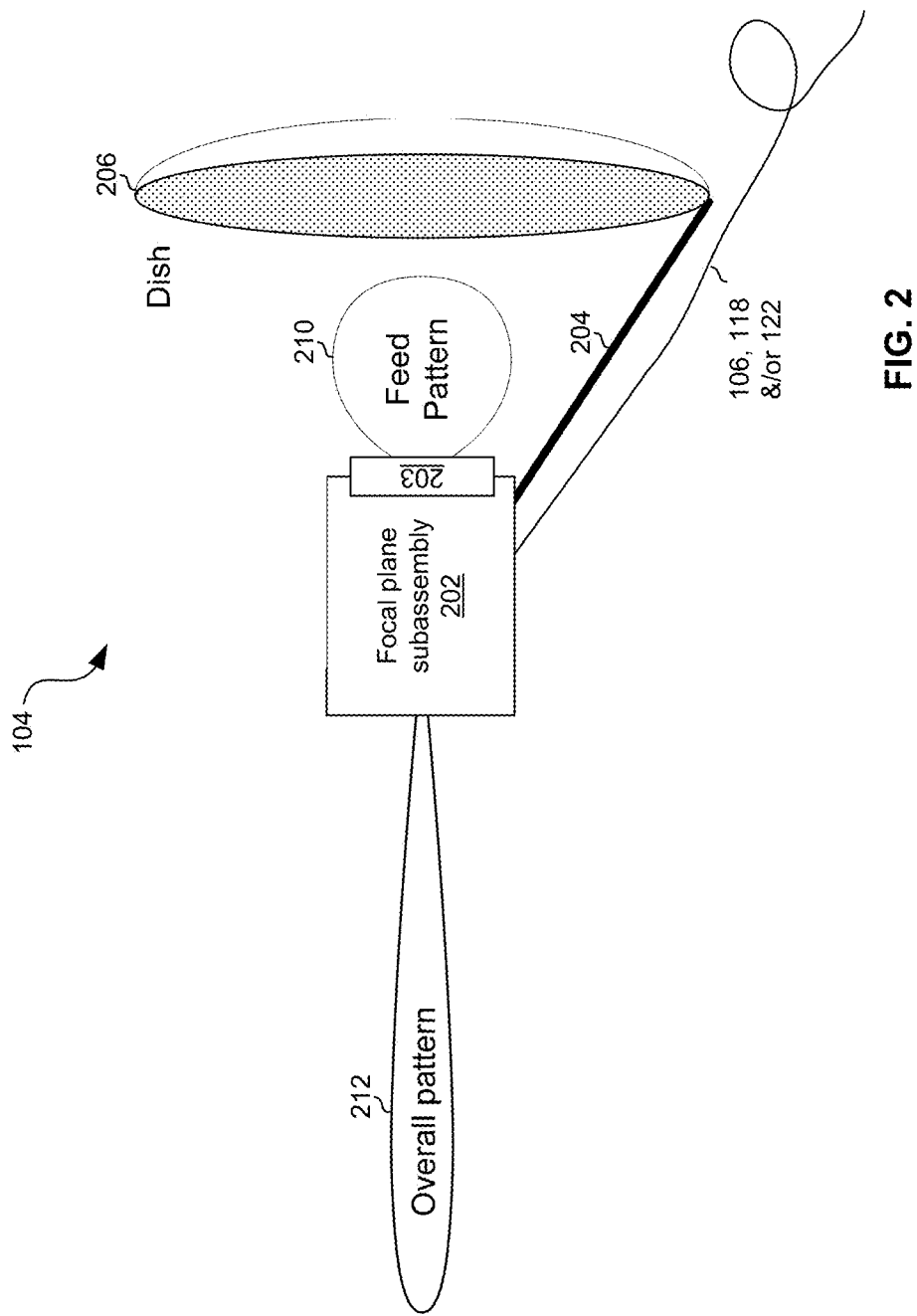
FIG. 2 shows an example implementation of a steerable microwave backhaul outdoor unit.

The backhaul ODU 104 may comprise one or more antenna elements and circuitry for processing microwave signals received via the antenna elements. The antenna elements may be, for example, feedhorns and/or microstrip patches. The antenna elements may directly receive backhaul signals or may receive them via a parabolic reflector or lens. FIG. 2, discussed below, depicts an example implementation in which a parabolic reflector is utilized. The circuitry may comprise one or more semiconductor dies ("chips" or "chipsets") arranged on one or more printed circuit boards.

Examples of such chips or chipsets include chips or chipsets 402, 520, and 550 described below.

The IDU 108 may comprise circuitry for processing: signals received from the cellular circuitry 124, signals to be sent to the cellular circuitry 124, signals received from the backhaul ODU 104, signals to be sent to the backhaul ODU, signals received from the core network 114, and/or signals to be sent to the core network 114. The IDU 108 may perform switching/routing functions for relaying traffic among the cellular circuitry 124, the backhaul ODU 104, and the core network 114.

In an example implementation, such as the implementation described with reference to FIG. 5B below, functions traditionally performed by the IDU 108 may be performed by the cellular circuitry 124 (e.g., modulation and demodulation in accordance with standards used by the cellular network), by circuitry of the backhaul ODU 104 (e.g., modulation and demodulation in accordance with standards used for the microwave backhaul link), and/or by other circuitry mounted on the mast 112 (e.g., a switch/router for routing traffic among the core network 114, the cellular circuitry 124, and the backhaul ODU 104). Eliminating the IDU may be advantageous because, for example, it may eliminate the need to lease real estate adjacent to the mast, and may reduce power consumption.

In implementations in which the IDU 108 is present, cable 120 (which may be metal or fiber) may carry CPRI signals if cellular modulation/demodulation is performed by circuitry in the IDU 108, or carry Ethernet (or some other networking protocol) signals if cellular modulation/demodulation is performed by circuitry 124. In implementations in which the IDU 108 is eliminated, cable 120 may likewise be eliminated.

In implementations in which the IDU 108 is present, cable 106 (which may be metal or fiber) may carry a single backhaul channel converted down to intermediate frequency (IF), or may carry multiple backhaul channels converted down to IF and "stacked" as described, for example, in the above-incorporated application publication titled "_" and the above-incorporated application titled "Microwave Backhaul System Supporting Multiple Installation Configurations". There may be multiple cables 106, each carrying a respective one of a plurality of captured backhaul channels or carrying a respective one of a plurality of sets of stacked channels. In implementations in which the IDU 108 is not present, cable(s) 106 may likewise be eliminated.

In all-outdoor backhaul implementations in which the IDU 108 is absent, cable(s) 118 may carry Ethernet (or some other networking protocol) signals between the ODU 104 and the core network 114. In implementations in which the IDU 108 is present, cable(s) 118 may be eliminated.

In all-outdoor backhaul implementations in which the IDU 108 is absent, cable(s) 122 may carry Ethernet (or some other networking protocol) signals between the cellular circuitry 124 and the ODU 104. In implementations in which the IDU 108 is present, cable(s) 122 may be absent.

FIG. 2 shows an example implementation of a steerable microwave backhaul outdoor unit. The example ODU 104 shown comprises a subassembly 202 mounted to a support structure 204 (which may, in turn, mount the assembly to the mast/tower 112, building, or other structure, not shown in FIG. 2), and one or more cables 106, 118, and/or 122 which carry traffic among the ODU 104 the indoor unit 108, and the cellular circuitry 124. The subassembly 202 may be mounted such that the antenna elements are positioned at or near a focal plane of the reflector 116. The subassembly may comprise, for example, one or more chips arranged on one or more printed circuit boards. The subassembly 202 comprises an antenna array 203 which in turn comprises a plurality of antenna elements. The antenna elements may be, for example, horns and/or microstrip patches. In the example implementation depicted, the antenna elements capture signals reflected by reflector 206 for reception and bounce signals off the reflector 116 for transmission. The radiation pattern 210 of the antenna array 202 corresponds to a radiation pattern 212 before (for receive), or after (for transmit), reflection off the reflector 206. Although the radiation patterns may comprise multiple lobes, only a main lobe is shown for simplicity of illustration. In another implementation, the antenna elements may directly receive backhaul signals, or receive them through a lens, for example.

Figure 3:
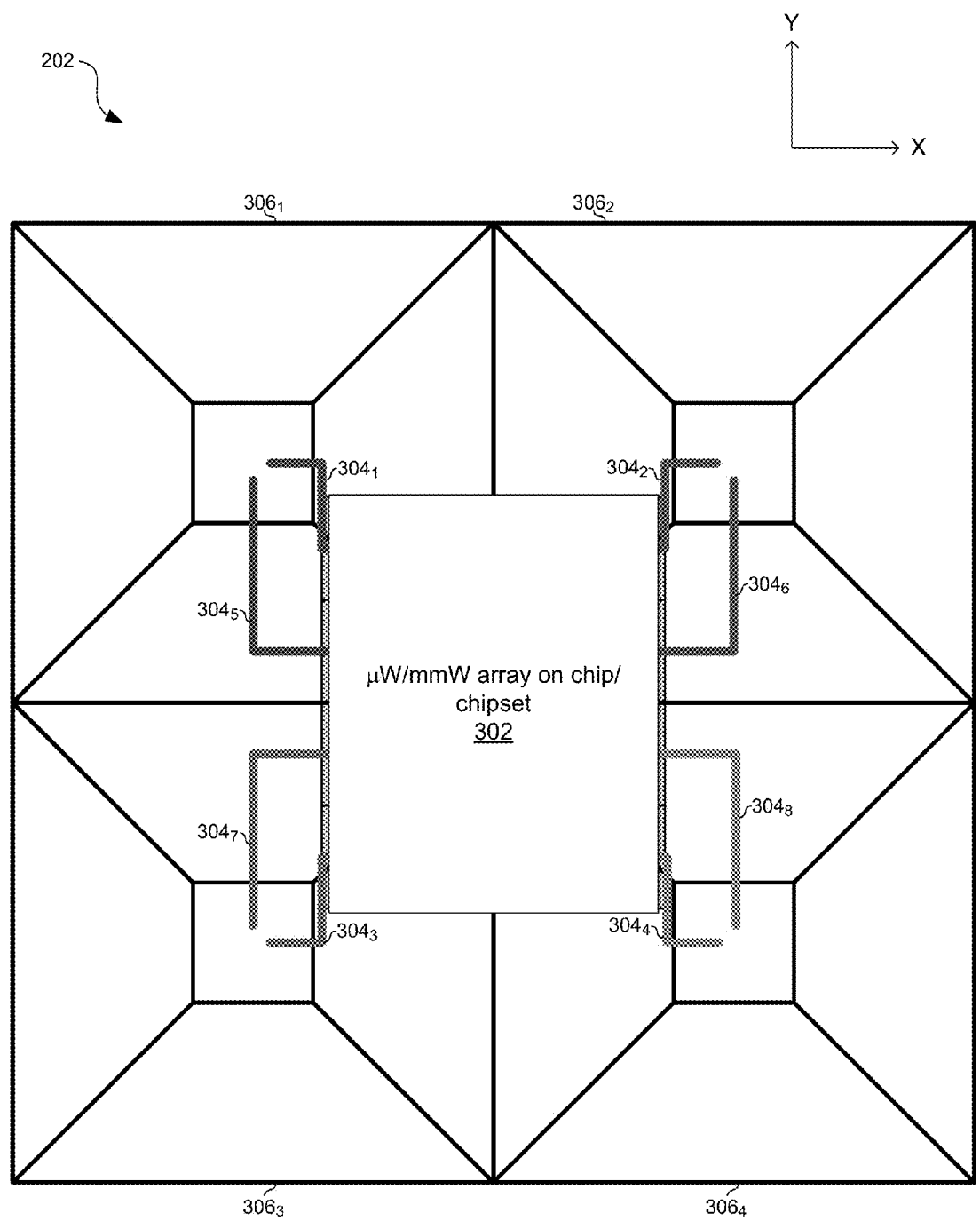
FIG. 3 shows an example implementation of the subassembly of FIG. 2.

FIG. 3 shows an example implementation of the subassembly of FIG. 2. The example subassembly 202 comprises four feed horns $306_1$-$306_4$, and a chip (or chipset) 302 which comprises eight transceivers for supporting two polarizations (e.g., horizontal and vertical, or clockwise and counterclockwise) for each feed horn 306. Each of the feed lines $304_1$-$304_8$ corresponds to a particular polarization of a particular one of the feed horns 306.

Although a four-feed-horn, eight-transceiver subassembly 202 is used for illustration, various implementations of the subassembly 202 may comprise any number of feed horns and any number of transceivers.

The feed lines $304_1$-$304_4$ correspond to a first polarization and the feed lines $304_5$-$304_8$ correspond to a second polarization. Accordingly, the subassembly 104 may be operable to concurrently receive two different signals on the same frequency but having different polarizations, concurrently transmit two different signals on the same frequency but having different polarizations, and/or transmit a first signal having a first polarization while concurrently receiving a second signal having a second polarization. Furthermore, the radiation pattern for the two polarizations may be controlled independently of one another. That is, two independent sets of amplitude and phase beamforming coefficients may be maintained by circuitry 302.

Figure 4:
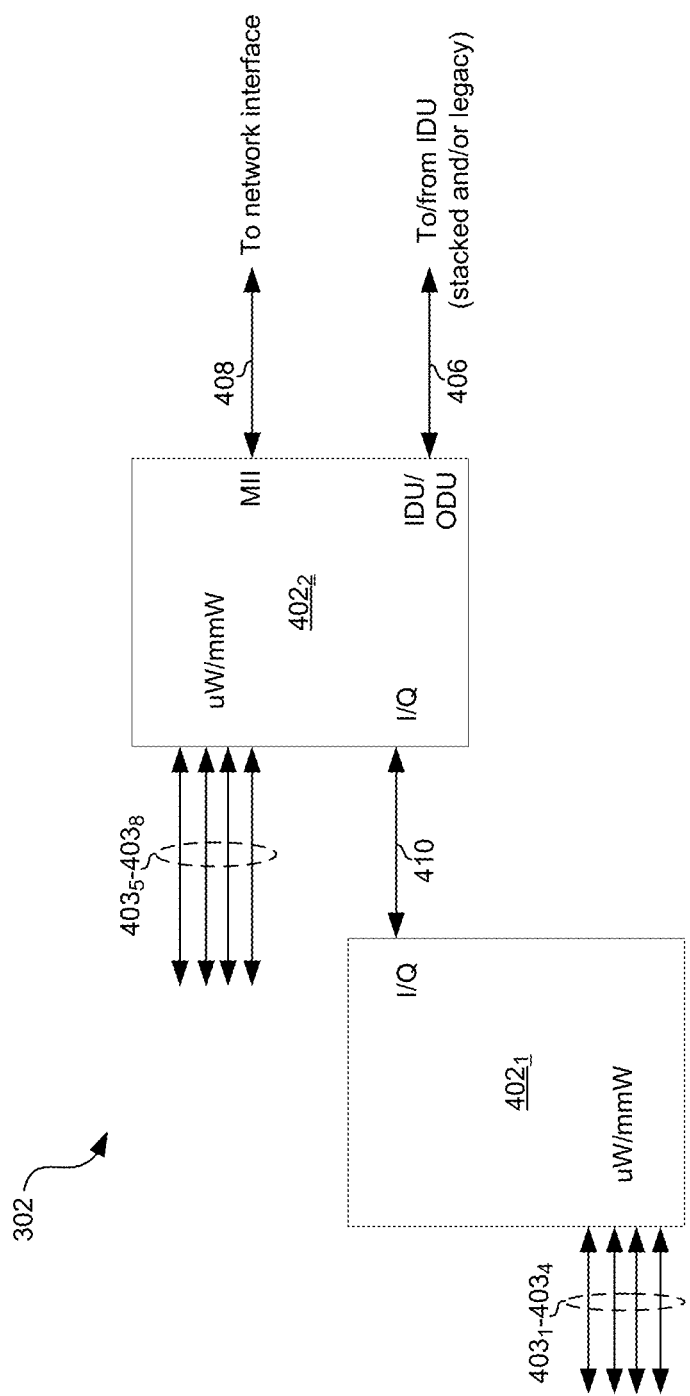
FIG. 4 shows an example implementation of the chipset of FIG. 3.

FIG. 4 shows an example implementation of the chipset of FIG. 3. In the example implementation depicted, the chipset 302 comprises two instances of the same chip 402, but with the two chips being differently configured. Each of the chips $402_1$ and $402_2$ may be, for example, a monolithic CMOS chip. Although not shown, the chipset may additionally comprise one or more monolithic low noise amplifier (LNA) chips and one or more monolithic power amplifier (PA) chips.

Each of the signals $403_1$-$403_8$ is a microwave signal received via a respective one of feed lines $304_1$-$304_8$. In an example implementation, the signal(s) 410 represent one or more digital in-phase and quadrature phase (I/Q) signal pairs, each I/Q pair from $402_2$ to $402_1$ being the result of processing of the signals $403_5$-$403_8$, and each I/Q pair from $402_1$ to $402_2$ being the result of processing of the signals $403_1$-$403_4$. It should be noted that, although this disclosure describes example implementations in which the auxiliary interface 506 communicates I/Q pairs, in other implementations signals communicated to and/or from auxiliary interface 506 may be intermediate frequency (IIF) signals and/or any of other suitable signal type.

The signals 410 are communicated between one or more auxiliary interfaces 506 (described below with reference to FIGS. 5A-5C). For reception, the processing to generate an I/Q pair may comprise, for example, amplification, quadrature downconversion, filtering, and digitization. In an implementation in which the signals 410 are IF signals, the digitization may be omitted. For transmission, the processing to generate an I/Q pair may comprise, for example, filtering, FEC encoding, bit-to-symbol mapping, and quadrature upconversion. In an implementation in which the signals 410 are IF signals, the digitization may be omitted.

The signals 408 may be conveyed in accordance with a media independent interface (MII) (e.g., GMII, RGMII or the like). For receive, the signal 408 may carry one or more datastreams recovered from one or more demodulated microwave backhaul channels and may be destined for a network interface (e.g., an Ethernet MAC/PHY). For transmission, the signal 408 may carry one or more datastreams from a network interface (e.g., Ethernet MAC/PHY) to be transmitted on one or more microwave backhaul channels.

The signals 406 comprise intermediate frequency (IF) signals generated by the interface 510 (described below with reference to FIG. 5A-5C).

Figure 5A:
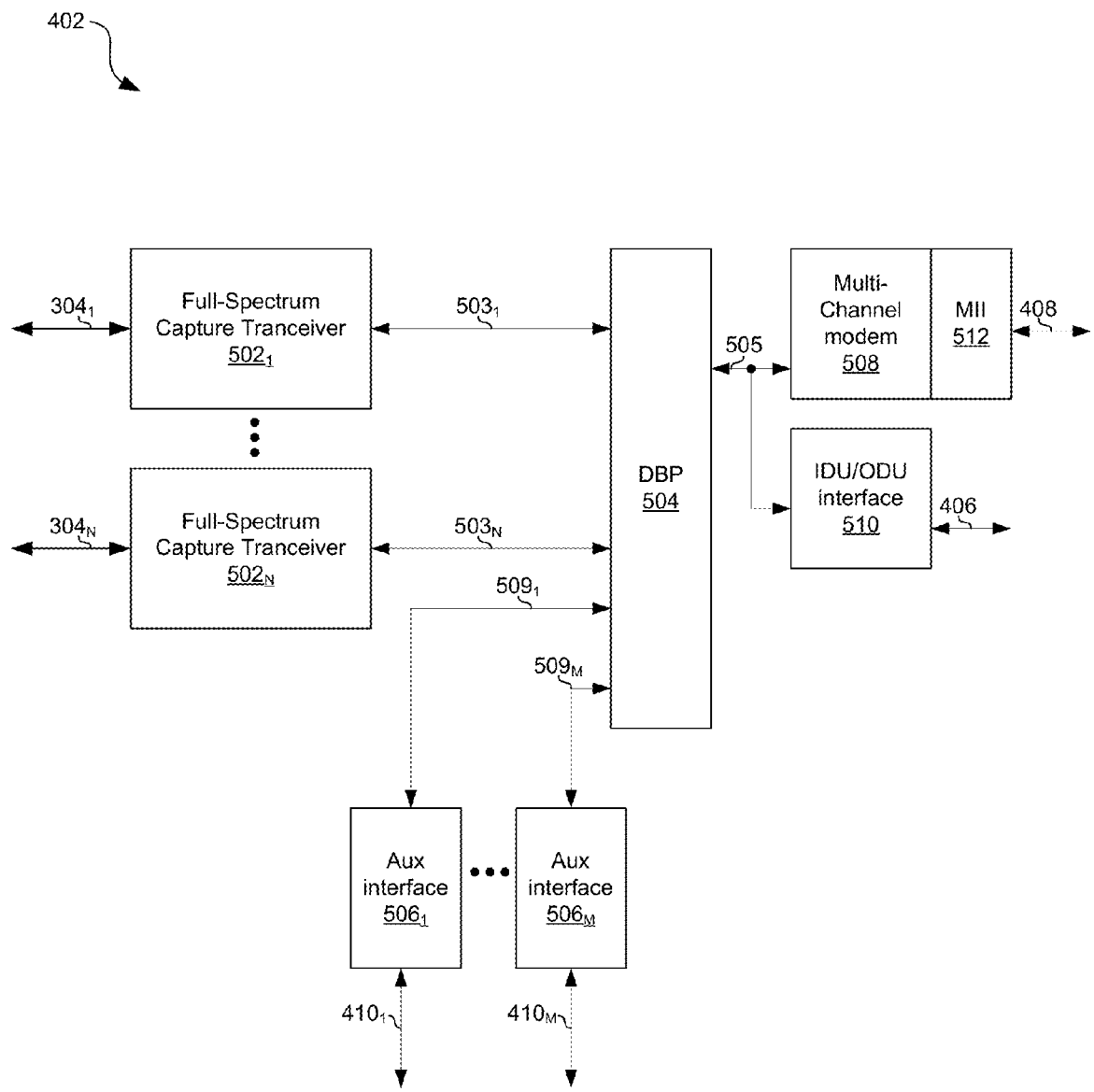
FIG. 5A shows an example implementation of a chip of the chipset of FIG. 3.

Referring to FIG. 5A, the chip 402 comprises N (a positive integer) full-spectrum capture (FSC) transceivers 502, a digital baseband processor (DBP) 504, a multi-channel modem 508, an IDU/ODU interface 510, and M (a positive integer) auxiliary interfaces $506_1$-$506_M$.

For receiving microwave backhaul signals via a corresponding feed line $304_n$, FSC transceiver $502_n$ (where $1 \leq n \leq N$) may comprise circuitry (e.g., amplifier(s), filter(s), quadrature downconverter(s), analog-to-digital converter(s), and/or the like) operable to concurrently digitize and downconvert all, or substantially all, of a particular frequency band that encompasses multiple channels of a wireless standard or protocol in use on a microwave backhaul link. For example, each transceiver $502_n$ may be operable to concurrently digitize and quadrature downconvert a particular polarization of the entire 17.1 GHz to 19.7 GHz band which encompasses multiple channels. Such channels may be, for example, 3.5 MHz, 7 MHz, 14 MHz, 28 MHz, 56 MHz or 112 MHz wide. Accordingly, the FSC transceiver 502n may comprise an adjustable channel select filter configurable to support one or more of such channel widths. For receive, each transceiver $502_n$ may output a digital I/Q signal pair, represented as $503_n$ in FIG. 5A, resulting from amplification, quadrature downconversion, filtering, and digitization performed in the transceiver $502_n$.

For transmitting microwave backhaul signals via a corresponding feed line $304_n$, FSC transceiver $502_n$ may comprise circuitry (e.g., digital-to-analog converters, quadrature upconverter(s), filter(s), amplifier(s), and/or the like) operable to modulate digital I/Q signals for transmission on a desired one or more channels of a particular frequency band that encompasses multiple channels of a wireless standard or protocol in use on a microwave backhaul link. For example, each transceiver $502_n$ may be operable to modulate a pair of I/Q signals onto any one or more of a plurality of channels in the 17.1 GHz to 19.7 GHz band. For transmit operations, a pair of I/Q signals represented as $503_n$ may be input to the transceiver $502_n$ where the pair of signals may be converted to an analog representation, upconverted, and amplified for output on a corresponding feed line 304.

The DBP 504 is operable to perform various digital signal processing operations for reception and transmission of microwave backhaul signals. Some example capabilities of the DBP 504 include:

The DBP 504 may be operable to perform I/Q mismatch calibration.

The DBP 504 may be operable to perform cross polarization interference cancellation (XPIC). In a split indoor and outdoor implementation, performing XPIC in the ODU 104 may enable treating different polarizations as independent links such that the IDU 108 need not be aware of the use of two different polarizations. This allows IDUs which do not have XPIC capabilities to be used in a dual polarization link to double the spectral efficiency. The ODU 104 may send the two polarizations down separate coax cables 106, or may stack the two polarizations onto a single cable 106 by placing them at different frequencies on the cable 106.

The DBP 504 may be operable to control the phase and/or amplitude of the signal pairs $503_1$-$503_N$ and $509_1$-$509_N$ to achieve beamforming (or "steering") in transmit and/or receive directions. Beamforming may be used to automatically align one or more beams 212 of the ODU 104 with one or more communication partners (other ODUs) as described, for example, in the above-incorporated U.S. patent application Ser. No. 14/249,014.

The DBP 504 may be operable to perform channelization whereby, for reception, desired channels of the captured frequency band(s) may be selected and downconverted for output to the ODU/IDU interface 510 and/or modem 508. This may drastically reduce the amount of bandwidth that the modem 508 and ODU/IDU interface 510 need to support. For example, the modem 508 and ODU/IDU interface 510 may only need to support a few channels as opposed to the entire 17.1 GHz to 19.7 GHz band. Similarly, for transmission, the DBP 504 may be operable to receive modulated baseband signals 505 and upconvert them to selected channels of the microwave band(s).

The DBP 504 may be operable to perform channel aggregation for combining a first number of received signals into in a second, lesser number of received signals.

The DBP 504 may be operable to measure characteristics of received signals and generate control signals based on the characteristics. For example, the DBP 504 may be operable to generate gain control signals for controlling gain and/or linearization of the transceivers $502_1$-$502_N$ and/or in off-chip amplifiers.

The signal 505 may be a modulated baseband signal. For transmission, the modem 508 may, for example, perform FEC encoding of a bitstream received via interface 512 and bit-to-symbol mapping to generate signal 505. For reception, the modem 508 may, for example, perform symbol-to-bit demapping of the signal 505 and FEC decoding to recover a bitstream output to interface 512.

The media independent interface (MII) 512 may convey signals in accordance with a standard/protocol such as GMII, RGMII, or the like. The MII 512 may interface to, for example, an Ethernet MAC/PHY (e.g., 1GBase-T, GEPON, 10GBase-T, 10G-EPON, or the like).

For reception, the ODU/IDU interface 510 may frequency-shift the signal 505 to an intermediate frequency band supported by the associated IDU 108. For IDUs which do not support channel stacking (stacking is described in, for example, the above-incorporated U.S. Patent Application Publication titled "Method and System for Integrated Stacking for Handling Channel Stacking or Band Stacking" and the above-incorporated United States Patent Application titled "Microwave Backhaul System Supporting Multiple Installation Configurations"), each channel of signal 505 may be shifted to the same frequency channel and output on its own coaxial cable. For IDUs 108 which do support stacking, M channels of the signal 505 may be shifted to M non-overlapping frequency channels and then the plurality of stacked channels may be conveyed to the IDU 108 via a single coaxial cable. Circuitry (e.g., an instance of chip 402) in the IDU 108 may then un-stack the channels back to baseband before conveying them to respective baseband processing paths.

For transmit, the ODU/IDU Interface 510 may frequency shift one or more frequency bands on one or more coaxial cables to baseband, as described in the above-incorporated United States Patent Application titled "Microwave Backhaul System Supporting Multiple Installation Configurations."

The presence of both the modem 508 and the ODU/IDU interface 510 allow the chip 402 to be backward compatible with existing IDUs which expect a dedicated coaxial cable for each channel between the ODU and IDU, forward compatible with IDUs which support channel stacking, and forward compatible with "all-outdoor" installations where there is no IDU.

The DBP 504 may be operable to support more than N transmit and N receive channels (where N is the number of on-chip transceivers 502). Accordingly, additional transceivers may be coupled to the DBP 504 via the auxiliary interface(s) 506. The DBP 504 may treat I/Q pairs (or, in other implementations, auxiliary IF signal(s)) (represented as 509 in FIG. 5A) to/from off-chip transceivers the same as I/Q pairs (or, in other implementations, auxiliary IF signal(s)) 503 from on-chip transceivers. The DBP 504 may be able to close a loop-through between the pairs 503 and 509 (i.e., pair $503_1$ may be connected to pair $509_1$, pair $503_2$ to pair $509_2$, and so on). This loop through may enable the I/Q pairs (or, in other implementations, auxiliary IF signal(s)) 503 of a first instance of chip 402 to be processed by the DBP 504 of a second instance of chip 402.

Each auxiliary interface $506_m$ may be operable to send signals 410 off-chip and receive signals 410 from off-chip. This may enable multiple instances of chip 402 to be used together in a modular, scalable approach. Referring to FIGS. 4 and 5A, assuming, for illustration, that each chip 402 comprises four transceivers, then driving a four-horn array with two polarizations requires eight transceivers. Accordingly, two instances of the chip 402 may be used and the outputs $503_1$-$503_4$ of the transceivers $502_1$-$502_4$ of chip $402_1$ may be conveyed to chip $402_2$ via the auxiliary interfaces $506_1$-$506_M$ of the two chips. In this example implementation, the DBP 504 of chip $402_1$ may be configured for loop-through of signals $503_1$-$503_4$ to signals $509_1$-$509_4$, while other portions of the DBP 504 and the modem 508 and ODU/IDU interface 510 of chip $402_1$ may be powered down in chip $402_1$. The DBP 504 of chip $402_2$ may be configured to process the eight I/Q pairs (four received via the transceivers $502_1$-$502_4$ of chip $402_2$ and four received as signals 410 via the auxiliary interfaces) to generate a corresponding one or more baseband signals 505.

In an example implementation, each signal $410_m$ may be, for example, a digital I/Q pair similar to signal $503_n$. In another example implementation, each signal $410_m$ may carry information of one or more digital I/Q pairs 503 suitable formatted for transmission between instances of chip 402. For example, an auxiliary interface $506_m$ may be operable to perform serialization and/or deserialization such that the N I/Q pairs may be transmitted over less than 2*N pins connecting the chips $402_1$ and $402_2$.

Figure 5B:
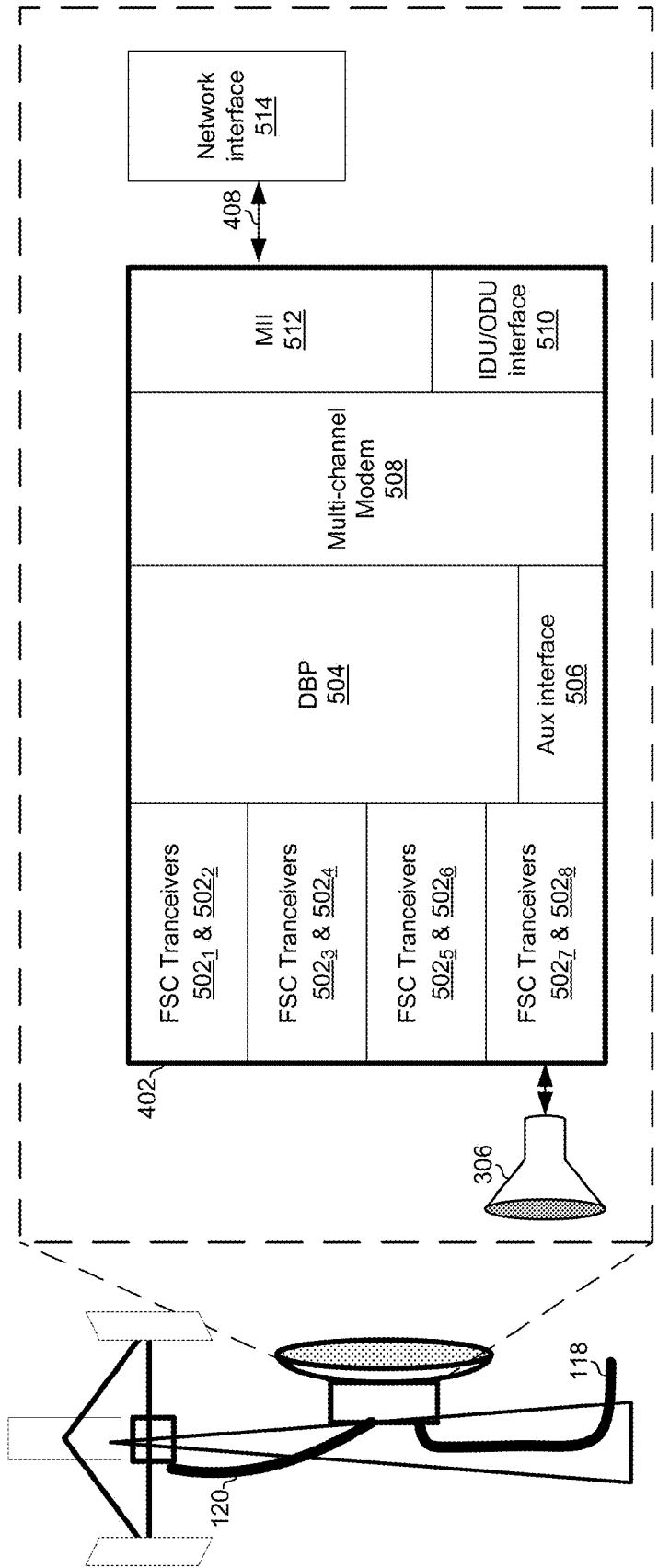
FIG. 5B shows an example all-outdoor implementation comprising the chip of FIG. 5A.

FIG. 5B shows an example all-outdoor implementation comprising the chip of FIG. 5A. For reception microwave backhaul signals are received via one or more antenna element(s) 306 and processed by one or more transceivers 502 to generate digital I/Q signals. The digital I/Q signals are then processed by the DBP 504. Particular channels selected by the DBP 504 are then conveyed to the modem 508 where they are demodulated to recover bitstreams which are then output to a network (e.g., Ethernet network) via the MII 512. For transmission, bitstreams are received from the network via the MII, modulated by modem 508, processed by DBP 504 to generate digital I/Q signals which are then conveyed to one or more transceivers 502 for transmission via the one or more antenna elements 306.

In an example implementation, transceivers $502_1$ and $502_2$ may be configured for processing a first microwave frequency band, transceivers $502_3$ and $502_4$ may be configured for processing a second microwave frequency band, transceivers $502_5$ and $502_6$ may be configured for processing a third microwave frequency band, transceivers $502_7$ and $502_8$ may be configured for processing a fourth microwave frequency band. Thus, instances of a single chip 402 may be used in a variety of backhaul towers which use a variety of frequency bands and configuration for a particular backhaul tower may comprise connecting the antenna elements to the appropriate one(s) of transceivers $502_1$-$502_8$. In the example shown in FIG. 5B, a single antenna element 306 and transceiver $502_7$ are used for backhauling a single polarization on a single frequency band. In another example scenario, a second antenna element 306 may be coupled to transceiver $502_8$ and two polarizations of the frequency band may be used for the particular backhaul link.

In another example scenario, one or more antenna elements 306 may be coupled to two or more of the transceivers 502 via one or more switching elements which may be dynamically controlled based on a frequency band to be used for a particular transmission or reception. For example, two antenna elements 306 may be time division multiplexed between transceivers $502_7$ and $502_8$ and transceivers $502_1$ and $502_2$, where transceivers $502_7$ and $502_8$ are configured for communication on a first frequency band and transceivers $502_1$ and $502_2$ are configured for communication on a second frequency band.

Figure 5C:
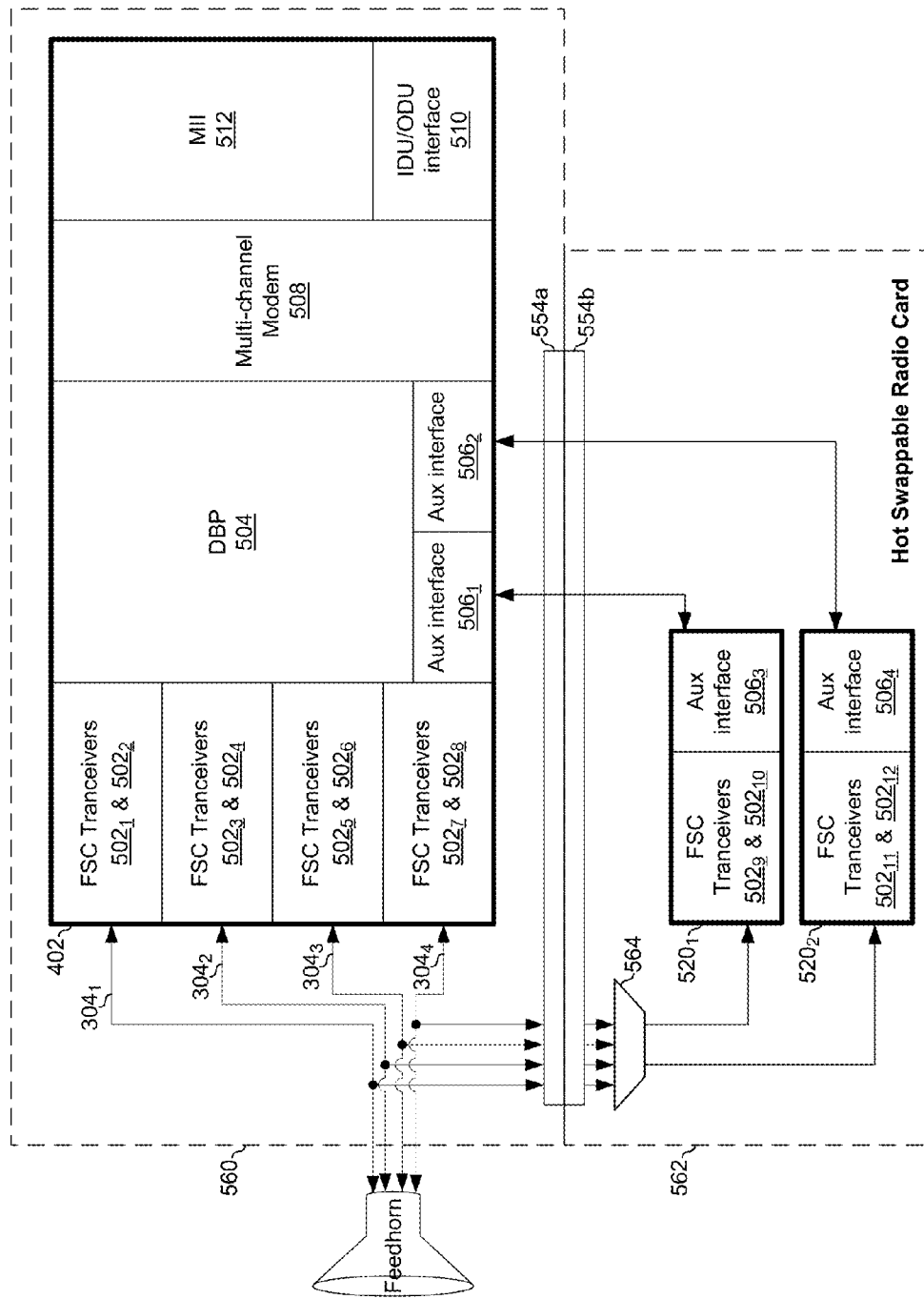
FIG. 5C shows an example implementation in which the chip FIG. 5A supports redundancy and how swapping for handling failures.

FIG. 5C shows an example implementation in which the chip of FIG. 5A supports redundancy and how swapping for handling failures. Shown in FIG. 5C is an instance of chip 402 residing on a printed circuit board (PCB) 560. One or more antenna elements 306 are coupled to the chip 402 via traces of the PCB. In the example implementation shown, there are fewer antenna elements 306 than transceivers 502 and, accordingly, the antenna elements are shared (e.g., time division multiplexed and/or frequency division multiplexed) among multiple transceivers 502. In this manner, the data rate that can be handled by an antenna element shared among X (a positive integer) transceivers 502 may be X times greater than the data rate that could be handled by a single transceiver. Thus, when all transceivers coupled to an antenna element or array of antenna elements are functioning properly, the data rate may be X. When one of the transceivers fail, the capacity may degrade gracefully and simply decline by 1/X. rather than the entire link failing.

In addition to gracefully degrading upon a transceiver failure, the assembly 560 may support hot-swapping of a failed transceiver 502 with a replacement transceiver 502. Specifically, an assembly 562 comprising one or more transceivers 502 and signal selection circuitry 564 may be connected to assembly 560 via connectors 554a and 554b. Once the assembly 562 is connected and the selection circuitry 564 is configured appropriately, the transceiver(s) 502 of the assembly 562 may effectively be connected in parallel with one or more of the on-chip transceivers 502 of the chip 402. One or more transceiver(s) 502 of the assembly 562 can then begin operating in place of a failed transceiver(s) 502 of the chip 402.

For example, initially a signal from a particular antenna element 306 may be processed by transceiver $502_3$ of chip 402. Transceiver $502_3$ of chip 402 may then fail. Upon failure of transceiver $502_3$ of the chip 402, if the card 562 is not already attached to the PCB 560 via connectors 554a and 554b, a technician may attach it in response to a failure alert generated by the chip 402 and sent out via the MII 512. If the card 562 is already attached to the PCB 560 via connectors 554a and 554b, the circuitry 564 may be automatically configured (e.g., in response to a failure detection signal generated by the DBP 504 and sent out via auxiliary interface $506_1$) to route the signal that was previously being processed by $502_3$ to transceiver $502_9$. The transceiver $502_9$ may then process the signal and convey the resulting signal to aux interface $506_3$ which may, in turn, convey the resulting signal to aux interface $506_1$. The aux interface $506_1$ may then convey the resulting signal to DBP 504 such that the signal is received at DBP 504 just as if it had been processed by transceiver $502_3$.

Figure 6:
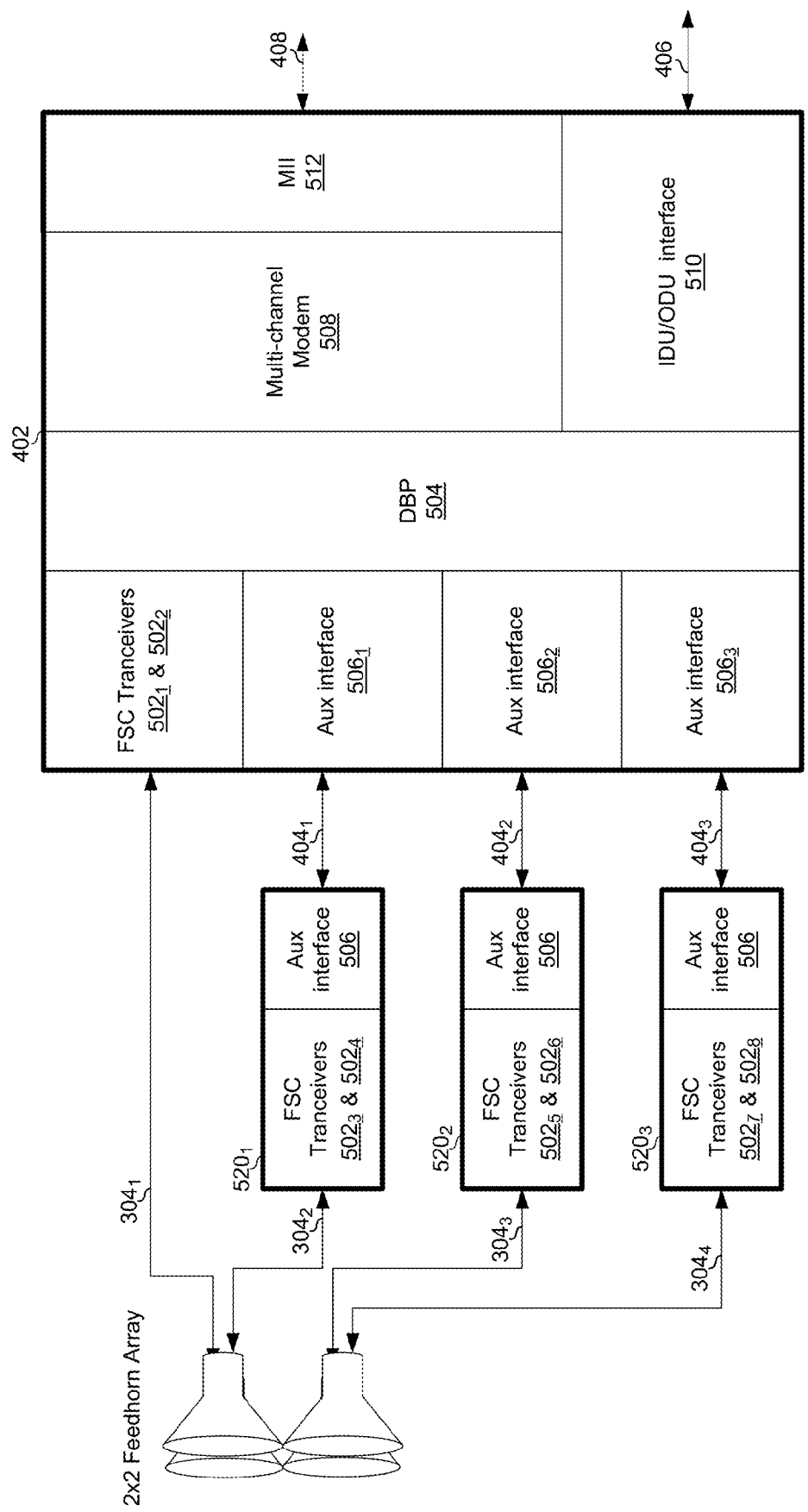
FIG. 6 depicts a chipset configured for one or more microwave backhaul links that are dynamically steerable.

FIG. 6 depicts a chipset configured for one or more microwave backhaul links that are dynamically steerable. The configuration of FIG. 6 may support dynamic compensation for twist and sway as described in the above-incorporated U.S. patent application Ser. No. 14/249,014. In FIG. 6, a chipset comprising one instance of 402 and three instances of 520 are coupled to a two-by-two array of antenna elements.

For reception, transceivers $502_1$ and $502_2$ of chip 402 handle signals from the first antenna element, and convey resulting signals to DBP 504 of the chip 402. Transceivers $502_3$ and $502_4$ of chip $520_1$ handle signals from the second antenna element and convey the resulting signals to the DBP 504 of chip 402 via the aux interface 506 of chip $520_1$ and the aux interface $506_1$ of chip 402. Transceivers $502_5$ and $502_6$ of chip $520_2$ handle signals from the third antenna element and convey the resulting signals to the DBP 504 of chip 402 via aux interface 506 of chip $520_2$ and aux interface $506_2$ of chip 402. Transceivers $502_7$ and $502_8$ of chip $520_3$ handle signals from the fourth antenna element and convey the resulting signals to the DBP 504 of chip 402 via aux interface 506 of chip $520_3$ and aux interface $506_3$ of chip 402. The DBP 504 may combine various ones of the signals from the antenna elements for beamforming and convey the resulting signals to the modem 508 and/or the ODU/IDO interface 510.

For transmission, the DBP 504 receives one or more datastreams from modem 508 and/or IDU/ODU interface 510. Based on the destination(s) of the received datastream(s), the DBP 504 controls the gain and phase of the four signals (per polarization) sent to the four antenna elements for transmitting the datastream(s) over the microwave backhaul link. The signal for the first antenna element is conveyed to transceivers $502_1$ and $502_2$ of chip 402. The signal for the second antenna element is conveyed to transceivers $502_3$ and $502_4$ of chip $520_1$ via auxiliary interface $506_1$ of chip 402 and auxiliary interface 506 of chip $520_1$. The signal for the third antenna element is conveyed to transceivers $502_5$ and $502_6$ of chip $520_2$ via auxiliary interface $506_2$ of chip 402 and auxiliary interface 506 of chip $520_2$. The signal for the fourth antenna element is conveyed to transceivers $502_7$ and $502_8$ of chip $520_3$ via auxiliary interface $506_3$ of chip 402 and auxiliary interface 506 of chip $520_3$.

In accordance with an example implementations of this disclosure, a microwave backhaul system may comprise an antenna element (e.g., 306) and a monolithic integrated circuit (e.g., $402_1$) comprising an on-chip transceiver (e.g., 502), digital baseband processing circuitry (e.g., 504), and auxiliary interface circuitry (e.g., 506). The on-chip transceiver may be operable to process a microwave signal from the antenna element to generate a first in-phase digital baseband signal and a first quadrature-phase digital baseband signal (e.g., collectively represented as $503_1$) and convey the first in-phase digital baseband signal and the first quadrature-phase digital baseband signal to the digital baseband processing circuitry. A bandwidth of the microwave signal may span multiple discontiguous microwave backhaul channels (e.g., a 112 MHz channels at or near 17.1 GHz and a 112 MHz channel at or near 19.7 GHz). The auxiliary interface circuitry may be operable to receive a second in-phase digital baseband signal and a second quadrature-phase digital baseband signal (e.g., collectively represented as $509_1$) from a source that is external to the monolithic integrated circuit (e.g., a second monolithic integrated circuit 402₂) and convey the second in-phase digital baseband signal and the second quadrature-phase digital baseband signal to the digital baseband processing circuitry. The digital baseband processing circuitry may be operable to process the first in-phase digital baseband signal, the first quadrature-phase digital baseband signal, the second in-phase digital baseband signal, the second quadrature-phase digital baseband signal to generate one or more third in-phase digital baseband signals and one or more third quadrature-phase baseband signals (e.g., collectively represented as 505). The digital baseband circuitry may be operable to perform phase shifting and weighted combining of the first in-phase digital baseband signal, the first quadrature-phase digital baseband signal, the second in-phase digital baseband signal, the second quadrature-phase digital baseband signal to generate the one or more third in-phase digital baseband signals and the one or more third quadrature-phase baseband signals. The digital baseband processing circuitry may be operable to concurrently recover a first one of the microwave backhaul channels from the first in-phase digital baseband signal and the first quadrature-phase digital baseband signal, and a second one of the microwave backhaul channels from the second in-phase digital baseband signal and the second quadrature-phase digital baseband signal. The monolithic integrated circuit may comprise demodulator circuitry (e.g., 508) operable to demodulate the recovered first one of the microwave channels and the recovered second one of the microwave channels. The auxiliary interface circuitry may be operable to perform serialization and deserialization. The system may comprise a connector (e.g., 554a) to which the microwave signal from the antenna element is connected and to which an input and/or output of the auxiliary interface circuitry is connected such that an off-chip transceiver can be connected in parallel with the on-chip transceiver. The digital baseband processing circuitry may be operable to detect a failure of the on-chip transceiver and, upon detection of such a failure, reconfigure itself to process signals from the off-chip transceiver for generation of the one or more third in-phase digital baseband signals and the one or more third quadrature-phase digital baseband signals. The digital baseband processing circuitry may be operable to receive a fourth in-phase digital baseband signal and fourth quadrature-phase digital baseband signal (e.g., represented collectively as 505), process the fourth in-phase digital baseband signal and the fourth quadrature-phase digital baseband signal to generate a fifth in-phase digital baseband signal and a fifth quadrature-phase digital baseband signal (e.g., represented collectively as $503_1$ and/or $509_1$), and output the fifth in-phase digital baseband signal and the fifth quadrature-phase digital baseband signal to one or both of the on-chip transceiver and the auxiliary interface circuitry. The digital baseband processing circuitry may be operable to receive a fourth in-phase digital baseband signal and fourth quadrature-phase digital baseband signal (e.g., represented collectively as 505), process the fourth in-phase digital baseband signal and the fourth quadrature-phase digital baseband signal to generate a fifth in-phase digital baseband signal, a fifth quadrature-phase digital baseband signal (e.g., represented collectively as $503_1$ and/or $509_1$), a sixth in-phase baseband signal, and a sixth quadrature-phase baseband signal (e.g., represented collectively as $503_2$ and/or $509_2$). A phase and amplitude of each of the fifth in-phase digital baseband signal, the fifth quadrature-phase digital baseband signal, the sixth in-phase baseband signal, and the sixth quadrature-phase baseband signal may be controlled based on a desired radiation pattern. The digital baseband processing circuitry may be operable to output the fifth in-phase digital baseband signal and the fifth quadrature-phase digital baseband signal to the on-chip transceiver, and output the sixth in-phase digital baseband signal and the sixth quadrature-phase digital baseband signal to the auxiliary interface circuitry.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a monolithic integrated circuit comprising an on-chip transceiver, digital baseband processing circuitry, and auxiliary interface circuitry, wherein:
said on-chip transceiver is operable to process a microwave signal from an antenna element to generate a first in-phase digital baseband signal and a first quadrature-phase digital baseband signal and convey said first in-phase digital baseband signal and said first quadrature-phase digital baseband signal to said digital baseband processing circuitry, wherein a bandwidth of said microwave signal spans multiple discontiguous microwave backhaul channels;
said auxiliary interface circuitry is operable to receive one or more auxiliary signals from a source that is external to said monolithic integrated circuit and convey said one or more auxiliary signals to said digital baseband processing circuitry;
said digital baseband processing circuitry is operable to process said first in-phase digital baseband signal, said first quadrature-phase digital baseband signal, and said one or more auxiliary signals to generate one or more second in-phase digital baseband signals and one or more second quadrature-phase baseband signals; and
said digital baseband processing circuitry is operable to perform phase shifting and weighted combining of said first in-phase digital baseband signal, said first quadrature-phase digital baseband signal, and said one or more auxiliary signals to generate said one or more second in-phase digital baseband signals and said one or more second quadrature-phase baseband signals.

2. The system of claim 1, wherein said one or more auxiliary signals comprises a third in-phase digital baseband signal and a third quadrature-phase digital baseband signal.

3. The system of claim 1, wherein said digital baseband processing circuitry is operable to:
concurrently recover a first one of said microwave backhaul channels from said first in-phase digital baseband signal and said first quadrature-phase digital baseband signal, and a second one of said microwave backhaul channels from said one or more auxiliary signals.

4. The system of claim 3, wherein said monolithic integrated circuit comprises:
demodulator circuitry operable to demodulate said recovered first one of said microwave backhaul channels and said recovered second one of said microwave backhaul channels.

5. The system of claim 1, wherein said auxiliary interface circuitry is operable to perform serialization and deserialization.

6. The system of claim 1, wherein said system comprises a connector to which said microwave signal from said antenna element is connected and to which an input and/or output of said auxiliary interface circuitry is connected such that an off-chip transceiver can be connected in parallel with said on-chip transceiver.

7. The system of claim 6, wherein said digital baseband processing circuitry is operable to detect a failure of said on-chip transceiver and, upon detection of such a failure, reconfigure itself to process signals from said off-chip transceiver for generation of said one or more second in-phase digital baseband signals and said one or more second quadrature-phase digital baseband signals.

8. The system of claim 1, wherein:
said digital baseband processing circuitry is operable to:
receive a fourth in-phase digital baseband signal and fourth quadrature-phase digital baseband signal;
process said fourth in-phase digital baseband signal and said fourth quadrature-phase digital baseband signal to generate a fifth in-phase digital baseband signal and a fifth quadrature-phase digital baseband signal; and
output said fifth in-phase digital baseband signal and said fifth quadrature-phase digital baseband signal to one or both of said on-chip transceiver and said auxiliary interface circuitry.

9. The system of claim 1, wherein:
said microwave signal spans from 17.1 GHz to 19.7 GHz; and
a bandwidth of each of said microwave backhaul channels is one of 3.5 MHz, 7 MHz, 14 MHz, 28 MHz, 56 MHz and 112 MHz.

10. A system comprising:
a monolithic integrated circuit comprising an on-chip transceiver, digital baseband processing circuitry, and auxiliary interface circuitry, wherein:
  said on-chip transceiver is operable to process a microwave signal from an antenna element to generate a first in-phase digital baseband signal and a first quadrature-phase digital baseband signal and convey said first in-phase digital baseband signal and said first quadrature-phase digital baseband signal to said digital baseband processing circuitry, wherein a bandwidth of said microwave signal spans multiple discontiguous microwave backhaul channels;
  said auxiliary interface circuitry is operable to receive one or more auxiliary signals from a source that is external to said monolithic integrated circuit and convey said one or more auxiliary signals to said digital baseband processing circuitry; and
  said digital baseband processing circuitry is operable to:
    process said first in-phase digital baseband signal, said first quadrature-phase digital baseband signal, and said one or more auxiliary signals to generate one or more second in-phase digital baseband signals and one or more second quadrature-phase baseband signals;
    receive a fourth in-phase digital baseband signal and fourth quadrature-phase digital baseband signal;
    process said fourth in-phase digital baseband signal and said fourth quadrature-phase digital baseband signal to generate a fifth in-phase digital baseband signal, a fifth quadrature-phase digital baseband signal, a sixth in-phase baseband signal, and a sixth quadrature-phase baseband signal, wherein a phase and amplitude of each of said fifth in-phase digital baseband signal, said fifth quadrature-phase digital baseband signal, said sixth in-phase baseband signal, and said sixth quadrature-phase baseband signal are determined based on a desired radiation pattern;
    output said fifth in-phase digital baseband signal and said fifth quadrature-phase digital baseband signal to said on-chip transceiver; and
    output said sixth in-phase digital baseband signal and said sixth quadrature-phase digital baseband signal to said auxiliary interface circuitry.

11. A method comprising:
performing in a monolithic integrated circuit of a microwave backhaul communication system:
  processing a microwave signal from an antenna element to generate a first in-phase digital baseband signal and a first quadrature-phase digital baseband signal;
  conveying said first in-phase digital baseband signal and said first quadrature-phase digital baseband signal to digital baseband processing circuitry, wherein a bandwidth of said microwave signal spans multiple discontiguous microwave backhaul channels;
  receiving one or more auxiliary signals from a source that is external to said monolithic integrated circuit;
  conveying said one or more auxiliary signals to said digital baseband processing circuitry;
  processing said first in-phase digital baseband signal, said first quadrature-phase digital baseband signal, and said one or more auxiliary signals to generate one or more second in-phase digital baseband signals and one or more second quadrature-phase baseband signals;
  receiving a fourth in-phase digital baseband signal and fourth quadrature-phase digital baseband signal;
  processing said fourth in-phase digital baseband signal and said fourth quadrature-phase digital baseband signal to generate a fifth in-phase digital baseband signal, a fifth quadrature-phase digital baseband signal, a sixth in-phase baseband signal, and a sixth quadrature-phase baseband signal, wherein said processing comprises controlling a phase and amplitude of each of said fifth in-phase digital baseband signal, said fifth quadrature-phase digital baseband signal, said sixth in-phase baseband signal, and said sixth quadrature-phase baseband signal based on a desired radiation pattern;
  outputting said fifth in-phase digital baseband signal and said fifth quadrature-phase digital baseband signal to an on-chip transceiver; and
  outputting said sixth in-phase digital baseband signal and said sixth quadrature-phase digital baseband signal to said an on-chip transceiver.

12. A method comprising:
performing in a monolithic integrated circuit of a microwave backhaul communication system:
  processing a microwave signal from an antenna element to generate a first in-phase digital baseband signal and a first quadrature-phase digital baseband signal;
  conveying said first in-phase digital baseband signal and said first quadrature-phase digital baseband signal to digital baseband processing circuitry, wherein a bandwidth of said microwave signal spans multiple discontiguous microwave backhaul channels;
  receiving one or more auxiliary signals from a source that is external to said monolithic integrated circuit;
  conveying said one or more auxiliary signals to said digital baseband processing circuitry;
  processing said first in-phase digital baseband signal, said first quadrature-phase digital baseband signal, and said one or more auxiliary signals to generate one or more second in-phase digital baseband signals and one or more second quadrature-phase baseband signals; and
  phase shifting and performing weighted combining of said first in-phase digital baseband signal, said first quadrature-phase digital baseband signal, and said one or more auxiliary signals to generate said one or more second in-phase digital baseband signals and said one or more second quadrature-phase baseband signals.

13. The method of claim 12, wherein said one or more auxiliary signals comprises a third in-phase digital baseband signal and a third quadrature-phase digital baseband signal.

14. The method of claim 12, comprising concurrently recovering a first one of said microwave backhaul channels from said first in-phase digital baseband signal and said first quadrature-phase digital baseband signal, and a second one of said microwave backhaul channels from said one or more auxiliary signals.

15. The method of claim 14 comprising demodulating said recovered first one of said microwave backhaul channels and said recovered second one of said microwave backhaul channels.

16. The method of claim 14, comprising serializing said first in-phase digital baseband signal and said first quadrature-phase digital baseband signal for communication to a destination external to said monolithic integrated circuit.

17. The method of claim 12, wherein said system comprises a connector to which said microwave signal from said antenna element is connected and to which an input and/or output of said auxiliary interface circuitry is connected such that an off-chip transceiver is connected in parallel with a transceiver of said monolithic integrated circuit.

18. The method of claim 17, comprising detecting a failure of said transceiver of said monolithic integrated circuit and, upon said detection of said failure, reconfiguring said monolithic integrated circuit to process signals from said off-chip transceiver for generation of said one or more second in-phase digital baseband signals and said one or more second quadrature-phase digital baseband signals.

19. The method of claim 12, comprising:
receiving a fourth in-phase digital baseband signal and fourth quadrature-phase digital baseband signal;
processing said fourth in-phase digital baseband signal and said fourth quadrature-phase digital baseband signal to generate a fifth in-phase digital baseband signal and a fifth quadrature-phase digital baseband signal; and
outputting said fifth in-phase digital baseband signal and said fifth quadrature-phase digital baseband signal to one or both of a transceiver of said monolithic integrated circuit and auxiliary interface circuitry of said monolithic integrated circuit.

20. The method of claim 12, wherein:
said microwave signal spans from 17.1 GHz to 19.7 GHz; and
a bandwidth of each of said microwave backhaul channels is one of 3.5 MHz, 7 MHz, 14 MHz, 28 MHz, 56 MHz and 112 MHz.

* * * * *